United States Patent
DiGiovanna (10) Patent No.: US 10,397,966 B1
(45) Date of Patent: Aug. 27, 2019

(54) APPARATUS AND METHOD FOR ESTABLISHING A BI-DIRECTIONAL COMMUNICATION LINK BETWEEN A SYMBOL READER AND A SYMBOL READER CRADLE USING WIRELESS CHARGING COMPONENTS

(71) Applicant: Zebra Technologies Corporation, Lincolnshire, IL (US)

(72) Inventor: Robert W. DiGiovanna, Shirley, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/190,671

(22) Filed: Nov. 14, 2018

(51) Int. Cl.
| | |
|---|---|
| *H04B 5/00* | (2006.01) |
| *H04W 76/10* | (2018.01) |
| *G06K 7/14* | (2006.01) |
| *G06K 7/10* | (2006.01) |
| *H04W 4/80* | (2018.01) |
| *H04L 27/12* | (2006.01) |
| *H02J 7/02* | (2016.01) |
| *H02J 50/10* | (2016.01) |
| *H04W 88/02* | (2009.01) |

(52) U.S. Cl.
CPC ........ *H04W 76/10* (2018.02); *G06K 7/10722* (2013.01); *G06K 7/1413* (2013.01); *H02J 7/025* (2013.01); *H02J 50/10* (2016.02); *H04B 5/0037* (2013.01); *H04B 5/0087* (2013.01); *H04L 27/12* (2013.01); *H04W 4/80* (2018.02); *G06K 2007/10524* (2013.01); *H04W 88/02* (2013.01)

(58) Field of Classification Search
CPC ...... H04W 76/10; H04W 4/80; H04B 5/0037; H04B 5/0087; H04B 5/02; H02J 7/025; H02J 50/10; H06K 7/1413; H06K 7/0722
See application file for complete search history.

(56) References Cited

U.S. PATENT DOCUMENTS

| | | | | |
|---|---|---|---|---|
| 2012/0097745 | A1* | 4/2012 | Brock | G06K 7/10881 235/472.02 |
| 2018/0293412 | A1* | 10/2018 | Volta | G07G 1/0045 |
| 2019/0097454 | A1* | 3/2019 | Alldredge | H02J 7/345 |

* cited by examiner

*Primary Examiner* — Tuan Pham (57) ABSTRACT

A method and apparatus for establishing a bi-directional communication link between a reader and a base station using wireless charging components includes positioning the reader within the base station, and electrically charging a rechargeable power source of the reader by an induced current carried through an induction coil in response to an electromagnetic field generated by an induction coil of the base station. The reader receives a communication parameter that uniquely identifies a short-range communication transceiver of the base station by detecting a modulation in the induced current. In response, a short-range communication transceiver of the reader transmits an RF signal that includes the identification data and a request to establish a bi-directional communication link with short-range communication transceiver of the base station. In response to receiving the identification data and the request, the base station and the reader establish a bi-directional communication link via a short-range wireless communication protocol.

13 Claims, 5 Drawing Sheets

APPARATUS AND METHOD FOR ESTABLISHING A BI-DIRECTIONAL COMMUNICATION LINK BETWEEN A SYMBOL READER AND A SYMBOL READER CRADLE USING WIRELESS CHARGING COMPONENTS

BACKGROUND OF THE INVENTION

Conventional wireless barcode readers are charged in a charging base station using metallic charging contacts that directly contact metallic contacts in the base station, which are, in turn, connected to an electrical source. In addition, the base station communicates with the barcode reader over a bi-directional communication link using a short-range communication protocol, such as Bluetooth®, to, for example, provide software updates to the barcode reader. In order to establish the bi-directional communication link (e.g., pair the reader with the base station), the base station communicates the address of its transceiver (e.g., its Bluetooth® address) to the reader over the metallic contacts in addition to passing power to the barcode reader. Other wireless barcode readers are being developed that utilize contactless wireless charging, whereby an electromagnetic field generated by an induction coil in the base station induces a current in an induction coil in the reader, in order to charge a power supply component in the reader. However, eliminating the metallic contacts also eliminates the mechanism by which to establish the bi-directional communication link.

Accordingly, there is a need to establish a bi-directional communication link between a barcode reader and a base station having wireless charging components while the barcode reader is docked within the base station.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure provides a system that includes a symbol reader cradle and a symbol reader. The symbol reader cradle includes a cradle housing, a first short-range communication transceiver positioned within the cradle housing, a first induction coil configured to generate an oscillating electromagnetic field in response to an alternating current applied across the first induction coil, and a first controller. The first short-range communication transceiver is operable to maintain electronic communication via a short-range wireless communication protocol. The first controller is configured to modulate the alternating current applied across the first induction coil to transmit, via the oscillating electromagnetic field, a first communication parameter related to the first short-range communication transceiver. The first communication parameter includes identification data uniquely identifying the first short-range communication transceiver. The symbol reader includes a symbol reader housing, an imaging assembly positioned at least partially within the symbol reader housing, a rechargeable power source configured to be electrically charged and to supply an electric charge to power the imaging assembly, a second short-range communication transceiver positioned within the symbol reader housing, a second induction coil configured to carry an induced current in response to being exposed to the oscillating electromagnetic field, and a second controller communicatively coupled to the second short-range communication transceiver and to the second induction coil. The imaging assembly has a field of view (FOV), and is configured to capture image data related to a symbol code. The second short-range communication transceiver is operable to maintain electronic communication via the short-range wireless communication protocol. The second induction coil is coupled to the rechargeable power source, and the induced current carried through the second induction coil is used to electrically charge the rechargeable power source. In response to the symbol reader being positioned within the symbol reader cradle: 1) the rechargeable power source of the symbol reader is electrically charged by the induced current carried through the second induction coil; 2) the second controller receives the first communication parameter by detecting a modulation in the induced current carried through the second induction coil; 3) responsive to receiving the first communication parameter, the second controller instructs the second short-range communication transceiver to transmit, via the short-range wireless communication protocol, a radio frequency (RF) signal, the RF signal including (i) the identification data uniquely identifying the first short-range communication transceiver and (ii) a request to establish a bi-directional communication link with the first short-range communication transceiver; 4) the first short-range communication transceiver actively listens for the RF signal including (i) the identification data uniquely identifying the first short-range communication transceiver and (ii) the request to establish the bi-directional communication link with the first short-range communication transceiver; and 5) responsive to the first short-range communication transceiver receiving the RF signal, the first short-range communication transceiver and the second short-range communication transceiver establish the bi-directional communication link. The bi-directional communication link occurs via the short-range wireless communication protocol.

Another aspect of the present disclosure provides a system that includes a symbol reader cradle and a symbol reader. The symbol reader cradle includes a cradle housing, a first short-range communication transceiver positioned within the cradle housing, a first induction coil configured to generate an oscillating electromagnetic field in response to an alternating current applied across the first induction coil, and a first controller. The first short-range communication transceiver is operable to maintain electronic communication via a short-range wireless communication protocol. The first controller is configured to modulate the alternating current applied across the first induction coil to transmit, via the oscillating electromagnetic field, a first communication parameter related to the first short-range communication transceiver. The first communication parameter includes a Media Access Control (MAC) address uniquely identifying the first short-range communication transceiver. The symbol reader includes a symbol reader housing, an imaging assembly positioned at least partially within the symbol reader housing, a rechargeable power source configured to be electrically charged and to supply an electric charge to power the imaging assembly, a second short-range communication transceiver positioned within the symbol reader housing, a second induction coil configured to carry an induced current in response to being exposed to the oscillating electromagnetic field, and a second controller communicatively coupled to the second short-range communication transceiver and to the second induction coil. The imaging assembly has a field of view (FOV), and is configured to capture image data related to a symbol code. The second short-range communication transceiver is operable to maintain electronic communication via the short-range wireless communication protocol. The second induction coil is coupled to the rechargeable power source, and the induced current carried through the second induction coil is used to electrically charge the rechargeable power source. In response to the symbol reader being positioned within the symbol reader cradle: 1) the rechargeable power source of the symbol reader is electrically charged by the induced current carried through the second induction coil; 2) the second controller receives the first communication parameter by detecting a modulation in the induced current carried through the second induction coil; 3) responsive to receiving the first communication parameter, the second controller instructs the second short-range communication transceiver to transmit, via the short-range wireless communication protocol, a radio frequency (RF) signal, the RF signal including (i) the MAC address uniquely identifying the first short-range communication transceiver and (ii) a request to establish a bi-directional communication link with the first short-range communication transceiver; 4) the first short-range communication transceiver actively listens for the RF signal including (i) the MAC address uniquely identifying the first short-range communication transceiver and (ii) the request to establish the bi-directional communication link with the first short-range communication transceiver; and 5) responsive to the first short-range communication transceiver receiving the RF signal, the first short-range communication transceiver and the second short-range communication transceiver establish the bi-directional communication link. The bi-directional communication link occurs via the short-range wireless communication protocol.

A further aspect of the present disclosure provides a method of establishing a bi-directional communication link between a symbol reader and a symbol reader cradle using wireless charging components. The symbol reader includes a symbol reader housing and an imaging assembly positioned at least partially within the symbol reader housing. The imaging assembly has a field of view (FOV), and is configured to capture image data related to a symbol code. The symbol reader cradle includes a cradle housing. The method includes positioning the symbol reader within the symbol reader cradle, and applying an alternating current across a first induction coil positioned within the cradle housing. The first induction coil generates an oscillating electromagnetic field in response to the operation of applying the alternating current across the first induction coil. The method continues by modulating, via a first controller positioned within the cradle housing, the alternating current applied across the first induction coil to transmit, via the oscillating electromagnetic field, a first communication parameter related to a first short-range communication transceiver positioned within the cradle housing. The first communication parameter includes identification data uniquely identifying the first short-range communication transceiver. The method further continues by generating an induced current in a second induction coil positioned within the symbol reader housing in response to the second induction coil being exposed to the oscillating electromagnetic field. The second induction coil is coupled to a rechargeable power source positioned within the symbol reader housing, and the method electrically charges the rechargeable power source by the induced current carried through the second induction coil. The method further receives, at a second controller positioned within the symbol reader housing, the first communication parameter by detecting a modulation in the induced current carried through the second induction coil. Responsive to the operation of receiving the first communication parameter at the second controller, the method instructs, via the second controller, a second short-range communication transceiver positioned within the symbol reader housing to transmit, via a short-range wireless communication protocol, a radio frequency (RF) signal, the RF signal including (i) the identification data uniquely identifying the first short-range communication transceiver and (ii) a request to establish a bi-directional communication link with the first short-range communication transceiver. The first short-range communication transceiver actively listens for the RF signal including (i) the identification data uniquely identifying the first short-range communication transceiver and (ii) the request to establish the bi-directional communication link with the first short-range communication transceiver. Responsive to the first short-range communication transceiver receiving the RF signal, the method establishes the bi-directional communication link between the first short-range communication transceiver and the second short-range communication transceiver. The bi-directional communication link occurs via the short-range wireless communication protocol.

Figure 1:
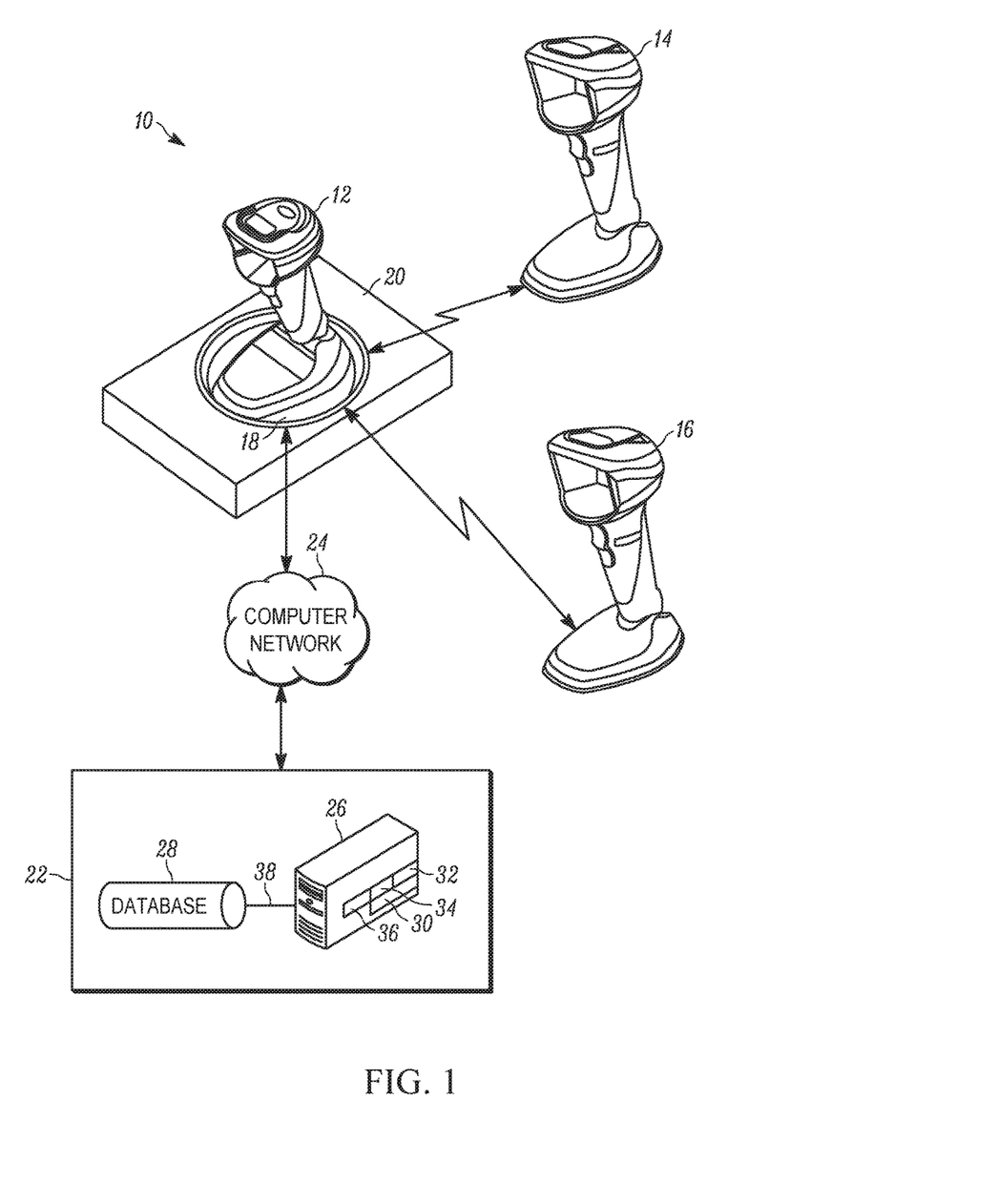
FIG. 1 is a block diagram of a communication system in accordance with an embodiment.

Referring now to the drawings, FIG. 1 illustrates various aspects of an exemplary architecture implementing a system 10 for communication between a host, a base station (also referred to as a symbol reader cradle) and one or more optical imaging readers (also referred to as symbol readers). The high-level architecture includes both hardware and software applications, as well as various data communication channels for communicating data between the various hardware and software components.

The communication system 10 includes front end components, including multiple readers 12, 14, 16 each of which is able to capture images of symbols and decode the symbols. In addition, each reader 12, 14, 16 is able to recharge on, and communicate with, a base station 18, such that a single base station 18 may communicate with multiple readers 12, 14, 16. For example, as shown, a first reader 12 is physically interfaced with the base station 18, while a second and third reader 14, 16 are remote from the base station 16, yet in communication with the base station 18. In this particular embodiment, the base station 18 is inset in a workstation surface 20, and a reader 12 interfaces with the base station 18 by having a base portion set on the surface of the base station. In this embodiment, the width of the bottom surface of the reader 12 (as well as the bottom surfaces of the readers 14, 16) is substantially flat and has a dimension that spans the diameter of the surface of the base station 18, which is also substantially flat. As discussed further below, the base portions of the readers 12, 14, 16 and the base station 18 each have induction coils. The induction coil of the base station 18 generates an oscillating electromagnetic field in response to an alternating current applied across its induction coil. When the reader 12 is physically interfaced with the base station 18, the induction coil of the reader 12 is aligned with the induction coil of the base station 18 and exposed to the electromagnetic field generated by the induction coil in the base station 18. The induction coil of the reader 12 then carries an induced current in response to being exposed to the oscillating electromagnetic field, and the induced current is used to electrically charge a rechargeable power source, such as a battery or capacitor, electrically coupled to the induction coil of the reader 12.

The frontend components, and, more particularly, the base station 18, are communicatively coupled to the backend components 22 via a computer network 24. The computer network 24 may be a network such as the Internet or other type of suitable network (e.g., local area network (LAN), a metropolitan area network (MAN), a wide area network (WAN), a mobile, a wired or wireless network, etc.). The computer network 24 may also be one or more cellular networks such as code division multiple access (CDMA) network, GSM (Global System for Mobile Communications) network, WiMAX (Worldwide Interoperability for Microwave Access) network, Long Term Evolution (LTE) network, etc.

The backend components 22 may include a data server 26 and a database 28. The backend components 22 in general, and the data server 26 in particular, includes computer-executable instructions 30. A processor of the data server 26 executes the instructions 30 to instantiate an access tool 32, a retrieval tool 34 and an analysis tool 36. The access tool 32 receives data from the base station 18, including data from the readers 12, 14, 16, and saves the data to one or more databases, such as the database 28. The retrieval tool 34 retrieves data from the database 28 or uses an identifier to access information from the database 28 relating to data for the base station 18 or readers 12, 14, 16, such as data specific to the make, model and operating systems of the readers 12, 14, 16. The database 28 may be a data storage device such as random-access memory (RAM), hard disk drive (HDD), flash memory, flash memory such as a solid state drive (SSD), etc. The analysis tool 136 may perform one or more analyses on the data and/or requests from the base station 18. The backend components 22 may communicate with each other through a communication network 38 such as a local area network or other type of suitable network (e.g., the Internet, a metropolitan area network (MAN), a wide area network (WAN), a mobile, a wired or wireless network, a private network, a virtual private network, etc.).

It should be appreciated that although FIG. 1 depicts only three readers 12, 14, 16 and one base station 18, the communication system 10 may include any number of readers 12, 14, 16 and base stations 18 communicating with the backend components 22. Further, the reader/base station system shown in FIG. 1 is but one embodiment, and those of ordinary skill should understand from the following disclosure that there are different techniques for interfacing a reader with a base station for inductive charging.

Figure 2:
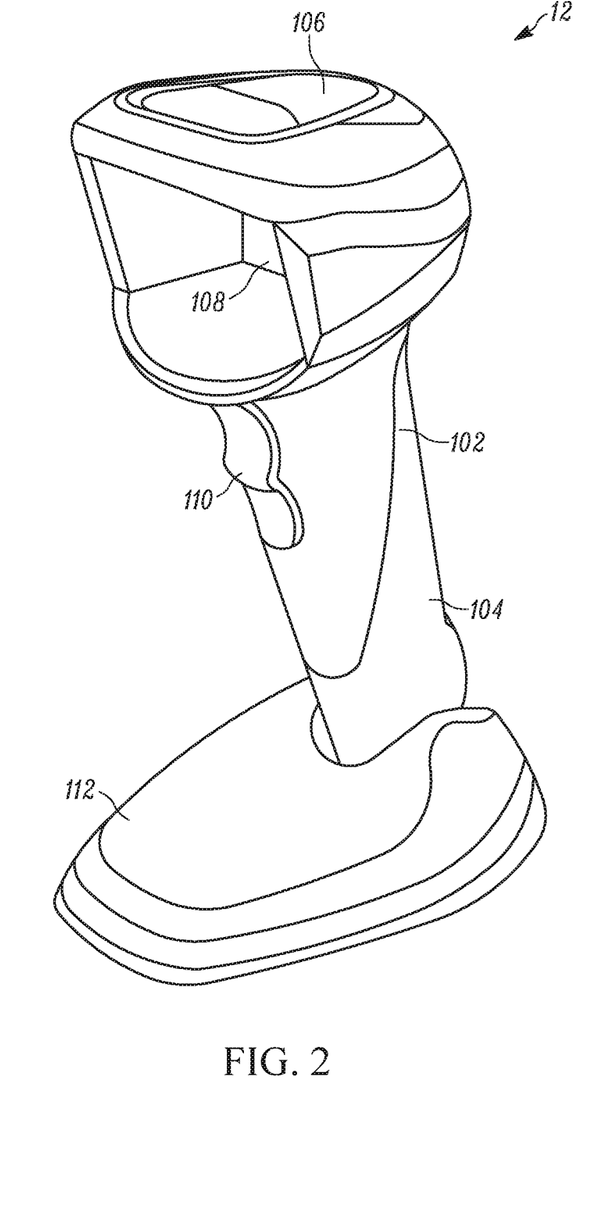
FIG. 2 illustrates a perspective view of a barcode reader of FIG. 1 according to an embodiment of the present invention.

FIG. 2 is an exemplary embodiment of the optical imaging reader 12 and components thereof, the disclosure of which is applicable to any one of the readers 12, 14, 16. The barcode reader 12 has a housing 102 with a handle portion 104, also referred to as a handle 104, and a head portion 106, also referred to as a scanning head 106. The head portion 106 includes a window 108, and is configured to be positioned on the top of the handle portion 104. The handle portion 104 is configured to be gripped by a reader user (not shown) and includes a trigger 110 for activation by the user. Included in the embodiment is a base 112, also referred to as a base portion, attached to the handle portion 104 opposite the head portion 106. The base portion 112 is configured to stand on a surface and support the housing 102 in a generally upright position. The barcode reader 12 can be used in a hands-free mode as a stationary workstation when it is placed on a countertop or other workstation surface. The barcode reader 12 can also be used in a handheld mode when it is picked up off the countertop or base station, and held in an operator's hand. In the hands-free mode, products can be slid, swiped past, or presented to the window 108. In the handheld mode, the barcode reader 12 can be moved towards a barcode on a product, and the trigger 110 can be manually depressed to initiate imaging of the barcode.

Other implementations may provide only handheld or only hands-free configurations. In one example, the reader 12 is ergonomically configured for a user's hand as a gun-shaped housing 102, though other configurations may be utilized as understood by those of ordinary skill in the art. In a further example, the lower handle 104 extends below and rearwardly away from the body 102 along a centroidal axis obliquely angled relative to a central field of view axis of a field of view of an imaging assembly within the scanning head 102. In another example, the lower handle 104 is omitted, and the body 102 has front and back sides, and lateral sides, with the window 108 in the front side, such that a user is able to grip the reader 12 with one hand via the lateral sides.

Figure 3A:
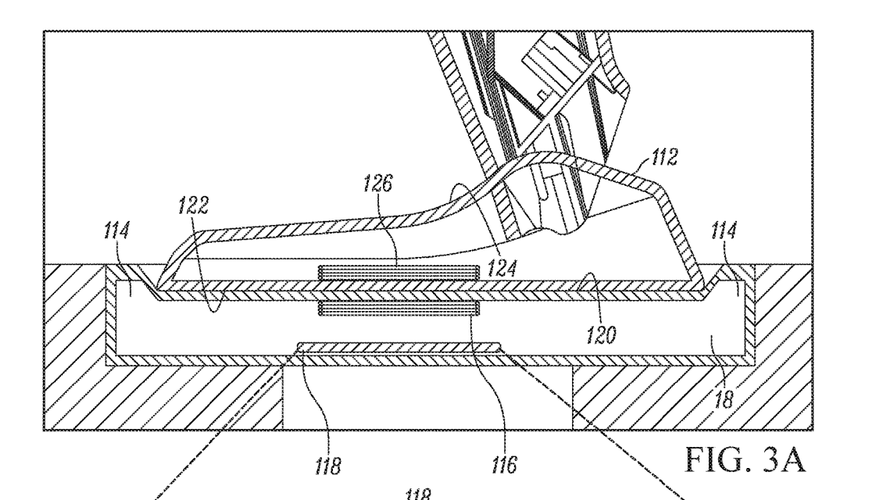
FIG. 3A illustrates a cross-sectional side view of a barcode reader and base station of FIG. 1 according to an embodiment of the present invention.

FIG. 3A is a cross-sectional view of an embodiment of the base portion 112 of the reader 12 positioned within a base station 18. As indicated above, in this embodiment the base station 18 is configured for placement within a countertop or other substantially flat support surface, though other embodiments of the base station 18 within, below or above the surface may be provided. The base station 18 has a flanged positioning feature 114 that encircles the base portion 112 when the base portion 112 is resting on the base station 18. The base station 18 houses an induction coil 116 operatively coupled to a control circuit 118. The embodiment shown in FIG. 3 may require modification to the countertop, namely a hole in the countertop in which to drop in the base station 18. In an embodiment, the hole in the countertop is counterbored to provide a coaxial hole through which to run a cable that connects with the control circuit 118, and a counterbore in which the base station 18 is seated.

The base station 18 includes a substantially flat base station surface 120 that extends in a single plane parallel to the plane of the countertop. The base portion 112 has a bottom surface 122, a top surface 124 and an induction coil 126. Generally speaking, the base station surface 120 is at least partly displaced from the surface of the countertop so as to keep the positioning feature 114 flush with the countertop, and to position a bottom surface 122 of the base portion 112 of the reader 12 on the base station surface 120. The positioning feature 114 prevents the base portion 112 from laterally moving off the base station 18 or otherwise misaligning the induction coil 116 with the induction coil 126 in the base portion 112 by encircling the bottom surface 122 of the base portion 112. In this embodiment, the positioning feature 114 forms a raised ring about the base portion 112, thereby allowing full rotation of the base portion 112 while seated on the base station 18.

In this embodiment, the bottom surface 122 extends along a single plane parallel to the base station surface 120. The bottom surface 122 and the base station surface 120 are each substantially flat in order to provide a stable interface between the base portion 112 and the base station 18. In at least one dimension, the bottom surface 122 spans the diameter of the base station surface 120 such that the flanged positioning feature 114 prevents lateral movement of the base portion 112, and aligns the induction coils 116, 126. The induction coil 116 in the base station 18 is positioned proximate the base station surface 120 and the induction coil 126 of the base portion 112 is positioned proximate the bottom surface 122, such that when the base portion 112 is positioned on the base station 18, the electromagnetic field generated by the induction coil 116 in the base station 18 causes a current to be generated in the induction coil 126 in the base portion 112.

Figure 3B:
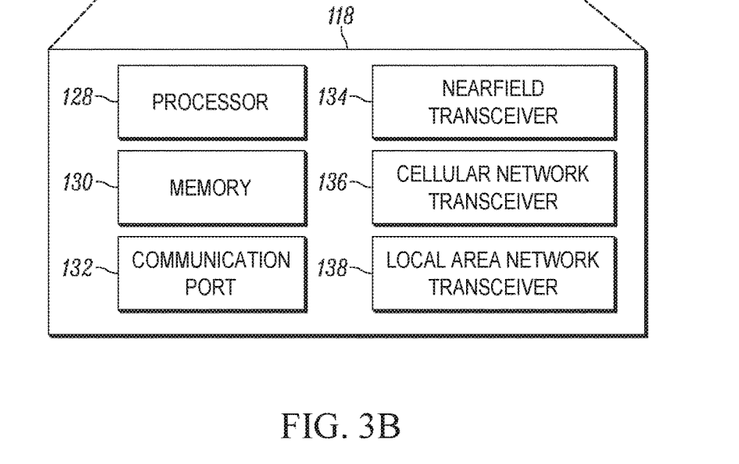
FIG. 3B illustrates a block schematic diagram of some of the components of the base station of FIG. 1 according to an embodiment of the present invention.

An exploded view of the control circuit 118 is shown as a block diagram in FIG. 3B depicting various components of the base station 18 that are operatively coupled to one another, including a controller, which includes a microcontroller or a processor 128, and a program memory 130, all of which are interconnected via an address/data bus (not shown). The processor 128 of the control circuit 118 executes instructions stored in the memory 130 to communicate with the reader 12. In particular, the controller 128 executes computer-executable instructions stored in the memory 130 to: 1) cause an alternating current to be applied across the induction coil 116 when the reader 12 is interfaced with the base station 18 so as to charge/recharge the reader 12; 2) communicate with the reader 12 via the induction coil 116 by modulating the alternating current applied across the induction coil 116 to transmit information via the oscillating electromagnetic field; and 3) communicate with the reader 12 via a short-range communication transceiver using a short-range wireless communication protocol.

It should be appreciated that although FIG. 3B depicts only one processor 128, the control circuit 118 may include multiple processors 128. Similarly, the memory 130 of the control circuit 118 may include multiple RAMs and multiple program memories storing one or more corresponding server application modules, according to the controller's particular configuration. The memory 130 may be implemented in a known form of computer storage media, including but not limited to, semiconductor memories, magnetically readable memories, and/or optically readable memories, for example, but does not include transitory media such as carrier waves.

The control circuit 118 also includes various communication components, including a hardwire communication port 132, such as a Universal Serial Bus (USB), and/or a wireless nearfield transceiver 134, such as a Bluetooth® transceiver or other short-range communication transceivers, for communicating with other frontend components, such as the readers 12, 14, 16 via a short-range wireless communication protocol. Further, the control circuit 118 includes a cellular network transceiver 136 and/or a local network transceiver 138, such as a WiFi transceiver based on IEEE (Institute of Electrical and Electronics Engineers) 802.11 standards, for communicating with backend components 22 via the computer network 24. In an embodiment, the processor 128 of the control circuit 118 executes instructions to manage and transmit data to the backend components 22 via the computer network 24, such as data associated with decoding a symbol captured in an image by the reader 12.

Figure 4:
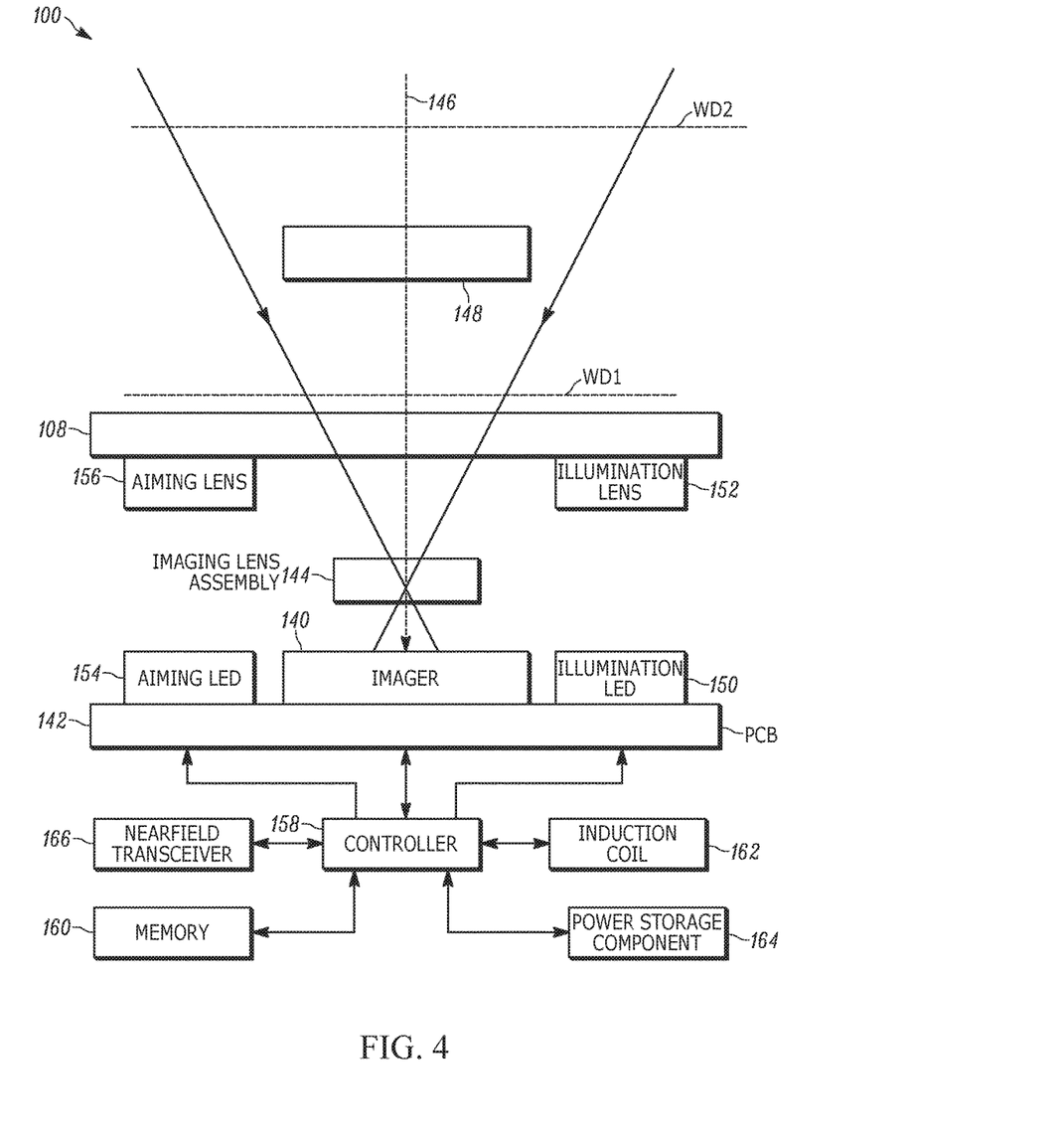
FIG. 4 illustrates a block schematic diagram of some of the components of the barcode reader of FIG. 1 according to an embodiment of the present invention.

Referring to FIG. 4, for any of the reader embodiments, an imaging assembly includes a light-detecting sensor or imager 140 operatively coupled to, or mounted on, a printed circuit board (PCB) 142 in the reader 12. In an embodiment, the imager 140 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 144 over a field of view along an imaging axis 146 through the window 108 in either mode of operation. The return light is scattered and/or reflected from a target 148 over the field of view. The imaging lens assembly 144 is operative for focusing the return light onto the array of image sensors to enable the target 148 to be read. The target 148 may be located anywhere in a working range of distances between a close-in working distance (WD1) and a far-out working distance (WD2). In a preferred embodiment, WD1 is about one-half inch from the window 108, and WD2 is about thirty inches from the window 108.

An illuminating light assembly is also mounted in the imaging reader 12. The illuminating light assembly includes an illumination light source, such as at least one light emitting diode (LED) 150 and at least one illumination lens 152, and preferably a plurality of illumination LEDs and illumination lenses, configured to generate a substantially uniform distributed illumination pattern of illumination light on and along the target 148 to be read by image capture. At least part of the scattered and/or reflected return light is derived from the illumination pattern of light on and along the target 148.

An aiming light assembly is also mounted in the imaging reader 12 and preferably includes an aiming light source 154, e.g., one or more aiming LEDs, and an aiming lens 156 for generating and directing a visible aiming light beam away from the reader 12 onto the target 148 in the handheld mode. The aiming light beam has a cross-section with a pattern, for example, a generally circular spot or cross-hairs for placement at the center of the target 148, or a line for placement across the target 148, or a set of framing lines to bound the field of view, to assist an operator in visually locating the target 148 within the field of view prior to image capture.

As also shown in FIG. 4, the imager 140, the illumination LED 150, and the aiming LED 154 are operatively connected to a controller or programmed microprocessor 158 operative for controlling the operation of these components. A memory 160 is connected and accessible to the controller 158. Preferably, the microprocessor 158 is the same as the one used for processing the captured return light from the illuminated target 148 to obtain data related to the target 148.

In this embodiment, the controller 148 functions as a power management circuit that electrically couples an induction coil 162 to a power storage component 164 or other rechargeable power source, such as a rechargeable battery or capacitor. In another embodiment, a separate circuit is provided as the power management circuit. In either embodiment, power management includes, but it not limited to an AC/DC conversion component, voltage conditioner component, etc., and the power storage component 164 powers different components of the reader 12, such as the imaging assembly, in a wireless handheld operation. It will also be understood by those of ordinary skill in the art that the term "electrically coupled" includes directly connected or indirectly connected, such that the induction coil 162 may be directly connected to the power storage component 164, or indirectly connected to the power storage component 164 including through any intervening components, such as the power management circuit and/or controller 148. Further, a wireless nearfield transceiver 166, such as a Bluetooth® transceiver or other short-range communication transceiver compatible with the short-range communication transceiver 134 of the reader 18, is coupled to the controller 148 for communicating with other frontend components, such as the base station 18, via the short-range wireless communication protocol.

As is known, the induction coil 116 of the base station 18 is coupled to a power source, such that an alternating current from the power source applied across the induction coil 116 will generate an oscillating electromagnetic field. A current is induced in the induction coil 162 of the reader 12 when it is placed within the electromagnetic field, such as when the reader 12 is seated on the base station 18 as shown in FIG. 3A. This current may be used to (re)charge the power storage component 164. For example, the base station 18 detects the presence of an object with an analog "ping" to measure a resonance shift in the induction coil 116 or to measure a capacitance change at the pins of the induction coil 116. Safeguards may be provided to avoid false positives when foreign objects are placed on the base station surface 120, such as monitoring link efficiency or a rise in temperature of the base station surface 120 and depowering the induction coil 116 if a threshold is reached. The controller 148 communicates power regulation information with the base station 18 via the induction coils 162, 116 using backscatter modulation by modulating the amount of power the reader 12 is using by switching the load coupled to the induction coil 162, and the base station 18 detects this modulation. In an example, the modulation looks like amplitude modulation.

Figure 5:
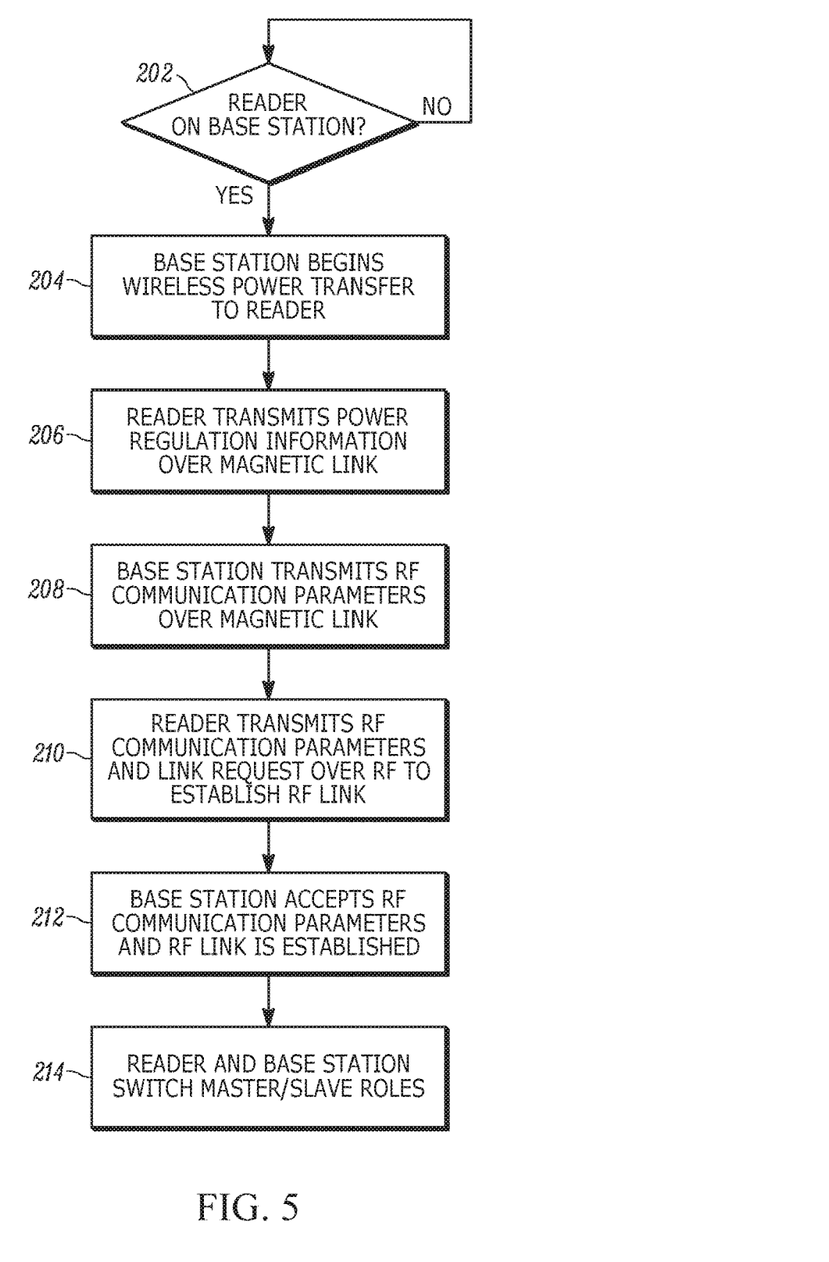
FIG. 5 illustrates a flowchart of a method of establishing a bi-directional communication link between the reader and base station of FIG. 1 using wireless charging components.

Referring to FIG. 5, a flowchart for communicating radio frequency (RF) parameters over the magnetic induction coil link established while the power storage component 164 is being electrically charged by the induced current carried through the induction coil 162 of the reader 12 (or any of the other readers 14, 16). Beginning at block 202, the reader 12 and base station 18 are interfaced by setting the reader 12 on the base station 18 so as to align the induction coils 162, 116, an example of which is shown in FIG. 3A. As disclosed above, the base station 18 detects the presence of the reader 12 and applies an alternating current across the induction coil 116 in order to generate an oscillating electromagnetic field at block 204, which, in turn, causes the induction coil 162 to carry an induced current to charge the power storage component 164. At block 206, the reader 12 transmits power regulation information to the base station 18 over the magnetic link by switching a load so as to cause backscatter modulation.

Having established the wireless power transfer from the base station 18 to the reader 12, at block 208 the controller 118 of the base station 18 modulates the alternating current 118 being applied across the induction coil 116 in order to transmit one or more communication parameters to the reader 12 via the magnetic link in order to establish communication via a separate RF wireless communication link. In particular, the controller 118 modulates the operating frequency of the alternating current according to a particular modulation scheme, such as frequency shift keying (FSK), in order to transmit a communication parameter that uniquely identifies the short-range transceiver, such as a media access control (MAC) address of the nearfield transceiver 134 for the RF wireless communication link.

The modulation of the current applied across the induction coil 116 modulates the electromagnetic field generated by the induction coil 116, which, in turn, modulates the current induced in the induction coil 162. The controller 158 of the reader 12 reads this modulation in the current induced in the induction coil 162 according to the modulation scheme (e.g., FSK), thereby receiving the communication parameter transmitted by the base station 18. In response to receiving the communication parameter, at block 210 the controller 158 of the reader 12 sends instructions to the short-range communication transceiver, such as the nearfield transceiver 166 to transmit to the short-range transceiver of the base station 18, such as the nearfield transceiver 116. In particular, the nearfield transceiver 166 of the reader 12 is instructed to transmit an RF signal using the short-range wireless communication protocol. The RF signal includes the communication parameter transmitted by the base station 18 via the electromagnetic link, such as the identification data that uniquely identifies the short-range transceiver of the base station 18 (e.g., the MAC address of the nearfield transceiver 116), along with a request for establishing a bi-directional communication link with the short-range transceiver of the base station 18 over the RF communication link, such as a Bluetooth® pairing request.

At block 212, the base station 18, and, more particularly, the short-range communication transceiver (e.g., the nearfield transceiver) is actively listening for the RF signal. In response to receiving the RF signal, the short-range communication transceiver of the base station and the short-range transceiver of the reader 12 establish the bi-directional communication link using the short-range communication protocol of the transceivers (e.g., Bluetooth®).

Up until this point, the reader 12 has been acting as the master and the base station 18 has been acting as the slave in a master/slave communication scheme. That is, the controller 118 of the base station 12 designates the base station 18 as the slave in response to modulating the alternating current applied across the induction coil 116 to transmit the communication parameter via the magnetic field. The controller 158 of the reader 12 technically initiates with a peripheral (slave), the peripheral being the base station 18, such that the controller 158 of the reader 12 establishes the reader 12 as the master when it receives the communication parameter via the magnetic field. As the master, the controller 158 instructs the nearfield transceiver 166 to transmit a request for bi-directional communication along with the MAC address of the nearfield transceiver 116. However, it is desirable that the base station 18 be the master, and the readers the slaves, so that the base station 18 may communicate (send and request data) with multiple readers 12, 14, 16, whereas the readers 12, 14, 16 only transmit to and receive from the base station 18. Accordingly, in response to establishing the bi-directional communication link at block 212, the base station 18 and the reader 12 change roles at block 214, such that the controller 118 of the base station 18 designates the base station 18 as the master and the controller 158 of the reader 12 designates the reader 12 as the slave in the bi-directional communication link, such designations being a matter of protocol. Thereafter, the base station 18 may establish bi-directional communication links with additional readers 14, 16 using the process described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
   a symbol reader cradle having:
   a cradle housing;
   a first short-range communication transceiver positioned within the cradle housing, the first short-range communication transceiver operable to maintain electronic communication via a short-range wireless communication protocol;
   a first induction coil configured to generate an oscillating electromagnetic field in response to an alternating current applied across the first induction coil; and
   a first controller configured to modulate the alternating current applied across the first induction coil to transmit, via the oscillating electromagnetic field, a first communication parameter related to the first short-range communication transceiver, the first communication parameter including identification data uniquely identifying the first short-range communication transceiver; and
   a symbol reader having:
   a symbol reader housing;
   an imaging assembly positioned at least partially within the symbol reader housing, the imaging assembly having a field of view (FOV), the imaging assembly being configured to capture image data related to a symbol code;

a rechargeable power source configured to be electrically charged and to supply an electric charge to power the imaging assembly;

a second short-range communication transceiver positioned within the symbol reader housing, the second short-range communication transceiver operable to maintain electronic communication via the short-range wireless communication protocol;

a second induction coil configured to carry an induced current in response to being exposed to the oscillating electromagnetic field, the second induction coil being coupled to the rechargeable power source, the induced current carried through the second induction coil being used to electrically charge the rechargeable power source; and a second controller communicatively coupled to the second short-range communication transceiver and to the second induction coil, wherein, responsive to the symbol reader being positioned within the symbol reader cradle:

the rechargeable power source of the symbol reader is electrically charged by the induced current carried through the second induction coil;

the second controller receives the first communication parameter by detecting a modulation in the induced current carried through the second induction coil;

responsive to receiving the first communication parameter, the second controller instructs the second short-range communication transceiver to transmit, via the short-range wireless communication protocol, a radio frequency (RF) signal, the RF signal including (i) the identification data uniquely identifying the first short-range communication transceiver and (ii) a request to establish a bi-directional communication link with the first short-range communication transceiver;

the first short-range communication transceiver actively listens for the RF signal including (i) the identification data uniquely identifying the first short-range communication transceiver and (ii) the request to establish the bi-directional communication link with the first short-range communication transceiver; and responsive to the first short-range communication transceiver receiving the RF signal, the first short-range communication transceiver and the second short-range communication transceiver establish the bi-directional communication link, the bi-directional communication link occurring via the short-range wireless communication protocol.

2. The system of claim 1, wherein the first controller is configured to modulate the alternating current applied across the first induction coil using a frequency-shift keying modulation scheme, and to transmit the first communication parameter related to the first short-range communication transceiver according to the frequency-shift keying modulation scheme.

3. The system of claim 1, wherein:

responsive to modulating the alternating current applied across the first induction coil to transmit the first communication parameter, the first controller establishes the symbol reader cradle as a slave in a master-slave communication scheme, responsive to receiving the first communication parameter, the second controller establishes the symbol reader as a master in the master-slave communication scheme, and responsive to establishing the bidirectional communication link, the second controller establishes the symbol reader as the slave in the master-slave communication scheme and the first controller establishes the symbol reader cradle as the master in the master-slave communication scheme.

4. The system of claim 1, wherein the symbol reader comprises a first symbol reader, the system further comprising, a second symbol reader, the second symbol reader having:

a second symbol reader housing;

a second imaging assembly positioned at least partially within the second symbol reader housing, the second imaging assembly having a field of view (FOV), the second imaging assembly being configured to capture image data related to a symbol code;

a second rechargeable power source configured to be electrically charged and to supply an electric charge to power the second imaging assembly;

a third short-range communication transceiver positioned within the second symbol reader housing, the third short-range communication transceiver operable to maintain electronic communication via the short-range wireless communication protocol;

a third induction coil configured to carry an induced current in response to being exposed to the oscillating electromagnetic field, the third induction coil being coupled to the rechargeable power source, the induced current carried through the third induction coil being used to electrically charge the second rechargeable power source; and a third controller communicatively coupled to the third short-range communication transceiver and to the third induction coil, wherein, responsive to the second symbol reader being positioned within the symbol reader cradle:

the second rechargeable power source of the second symbol reader is electrically charged by the induced current carried through the third induction coil;

the third controller receives the first communication parameter by detecting a modulation in the induced current carried through the third induction coil;

responsive to receiving the first communication parameter, the third controller instructs the third short-range communication transceiver to transmit, via the short-range wireless communication protocol, a radio frequency (RF) signal, the RF signal including (i) the identification data uniquely identifying the first short-range communication transceiver and (ii) a request to establish a second bi-directional communication link with the first short-range communication transceiver;

the first short-range communication transceiver actively listens for the RF signal including (i) the identification data uniquely identifying the first short-range communication transceiver and (ii) the request to establish the second bi-directional communication link with the first short-range communication transceiver; and responsive to the first short-range communication transceiver receiving the RF signal, the first short-range communication transceiver and the third short-range communication transceiver establish the second bi-directional communication link, the second bi-directional communication link occurring via the short-range wireless communication protocol.

5. A system comprising:

a symbol reader cradle having:
   a cradle housing;
   a first short-range communication transceiver positioned within the cradle housing, the first short-range communication transceiver operable to maintain electronic communication via a short-range wireless communication protocol;
   a first induction coil configured to generate an oscillating electromagnetic field in response to an alternating current applied across the first induction coil; and
   a first controller configured to modulate the alternating current applied across the first induction coil to transmit, via the oscillating electromagnetic field, a first communication parameter related to the first short-range communication transceiver, the first communication parameter including a Media Access Control (MAC) address uniquely identifying the first short-range communication transceiver; and a symbol reader having:
   a symbol reader housing;
   an imaging assembly positioned at least partially within the symbol reader housing, the imaging assembly having a field of view (FOV), the imaging assembly being configured to capture image data related to a symbol code;
   a rechargeable power source configured to be electrically charged and to supply an electric charge to power the imaging assembly;
   a second short-range communication transceiver positioned within the symbol reader housing, the second short-range communication transceiver operable to maintain electronic communication via the short-range wireless communication protocol;
   a second induction coil configured to carry an induced current in response to being exposed to the oscillating electromagnetic field, the second induction coil being coupled to the rechargeable power source, the induced current carried through the second induction coil being used to electrically charge the rechargeable power source; and
   a second controller communicatively coupled to the second short-range communication transceiver and to the second induction coil, wherein, responsive to the symbol reader being positioned within the symbol reader cradle:
   the rechargeable power source of the symbol reader is electrically charged by the induced current carried through the second induction coil;
   the second controller receives the first communication parameter by detecting a modulation in the induced current carried through the second induction coil;
   responsive to receiving the first communication parameter, the second controller instructs the second short-range communication transceiver to transmit, via the short-range wireless communication protocol, a radio frequency (RF) signal, the RF signal including (i) the MAC address uniquely identifying the first short-range communication transceiver and (ii) a request to establish a bi-directional communication link with the first short-range communication transceiver;
   the first short-range communication transceiver actively listens for the RF signal including (i) the MAC address uniquely identifying the first short-range communication transceiver and (ii) the request to establish the bi-directional communication link with the first short-range communication transceiver; and
   responsive to the first short-range communication transceiver receiving the RF signal, the first short-range communication transceiver and the second short-range communication transceiver establish the bi-directional communication link, the bi-directional communication link occurring via the short-range wireless communication protocol.

6. The system of claim 5, wherein the first controller is configured to modulate the alternating current applied across the first induction coil using a frequency-shift keying modulation scheme, and to transmit the first communication parameter related to the first short-range communication transceiver according to the frequency-shift keying modulation scheme.

7. The system of claim 5, wherein:
   responsive to modulating the alternating current applied across the first induction coil to transmit the first communication parameter, the first controller establishes the symbol reader cradle as a slave in a master-slave communication scheme,
   responsive to receiving the first communication parameter, the second controller establishes the symbol reader as a master in the master-slave communication scheme, and
   responsive to establishing the bidirectional communication link, the second controller establishes the symbol reader as the slave in the master-slave communication scheme and the first controller establishes the symbol reader as the master in the master-slave communication scheme.

8. The system of claim 5, wherein the symbol reader comprises a first symbol reader, the system further comprising, a second symbol reader, the second symbol reader having:
   a second symbol reader housing;
   a second imaging assembly positioned at least partially within the second symbol reader housing, the second imaging assembly having a field of view (FOV), the second imaging assembly being configured to capture image data related to a symbol code;
   a second rechargeable power source configured to be electrically charged and to supply an electric charge to power the second imaging assembly;
   a third short-range communication transceiver positioned within the second symbol reader housing, the third short-range communication transceiver operable to maintain electronic communication via the short-range wireless communication protocol;
   a third induction coil configured to carry an induced current in response to being exposed to the oscillating electromagnetic field, the third induction coil being coupled to the rechargeable power source, the induced current carried through the third induction coil being used to electrically charge the second rechargeable power source; and
   a third controller communicatively coupled to the third short-range communication transceiver and to the third induction coil,
   wherein, responsive to the second symbol reader being positioned within the symbol reader cradle:

the second rechargeable power source of the second symbol reader is electrically charged by the induced current carried through the third induction coil;

the third controller receives the first communication parameter by detecting a modulation in the induced current carried through the third induction coil;

responsive to receiving the first communication parameter, the third controller instructs the third short-range communication transceiver to transmit, via the short-range wireless communication protocol, a radio frequency (RF) signal, the RF signal including (i) the MAC address uniquely identifying the first short-range communication transceiver and (ii) a request to establish a second bi-directional communication link with the first short-range communication transceiver;

the first short-range communication transceiver actively listens for the RF signal including (i) the MAC address uniquely identifying the first short-range communication transceiver and (ii) the request to establish the second bi-directional communication link with the first short-range communication transceiver; and responsive to the first short-range communication transceiver receiving the RF signal, the first short-range communication transceiver and the third short-range communication transceiver establish the second bi-directional communication link, the second bi-directional communication link occurring via the short-range wireless communication protocol.

9. A method of establishing a bi-directional communication link between a symbol reader and a symbol reader cradle using wireless charging components, the symbol reader including a symbol reader housing and an imaging assembly positioned at least partially within the symbol reader housing, the imaging assembly having a field of view (FOV), the imaging assembly being configured to capture image data related to a symbol code, the symbol reader cradle including a cradle housing, the method comprising:

positioning the symbol reader within the symbol reader cradle;

applying an alternating current across a first induction coil positioned within the cradle housing, the first induction coil generating an oscillating electromagnetic field in response to the operation of applying the alternating current across the first induction coil;

modulating, via a first controller positioned within the cradle housing, the alternating current applied across the first induction coil to transmit, via the oscillating electromagnetic field, a first communication parameter related to a first short-range communication transceiver positioned within the cradle housing, the first communication parameter including identification data uniquely identifying the first short-range communication transceiver;

generating an induced current in a second induction coil positioned within the symbol reader housing in response to the second induction coil being exposed to the oscillating electromagnetic field, the second induction coil being coupled to a rechargeable power source positioned within the symbol reader housing;

electrically charging the rechargeable power source by the induced current carried through the second induction coil;

receiving, at a second controller positioned within the symbol reader housing, the first communication parameter by detecting a modulation in the induced current carried through the second induction coil;

responsive to the operation of receiving the first communication parameter at the second controller, instructing, via the second controller, a second short-range communication transceiver positioned within the symbol reader housing to transmit, via a short-range wireless communication protocol, a radio frequency (RF) signal, the RF signal including (i) the identification data uniquely identifying the first short-range communication transceiver and (ii) a request to establish a bi-directional communication link with the first short-range communication transceiver;

actively listening, via the first short-range communication transceiver, for the RF signal including (i) the identification data uniquely identifying the first short-range communication transceiver and (ii) the request to establish the bi-directional communication link with the first short-range communication transceiver; and responsive to the first short-range communication transceiver receiving the RF signal, establishing the bi-directional communication link between the first short-range communication transceiver and the second short-range communication transceiver, the bi-directional communication link occurring via the short-range wireless communication protocol.

10. The method of claim 9, wherein the operation of establishing the bi-directional communication link is concurrent with the operation of electrically charging the rechargeable power source.

11. The method of claim 9, wherein modulating, via the first controller positioned in the cradle housing, the alternating current applied across the first induction coil, comprises modulating, via the first controller positioned in the cradle housing, the alternating current applied across the first induction coil using a frequency-shift keying modulation scheme to transmit, via the oscillating electromagnetic field, the first communication parameter related to the first short-range communication transceiver according to the frequency-shift keying modulation scheme.

12. The method of claim 9, wherein:

responsive to the operation of modulating the alternating current applied across the first induction coil to transmit the first communication parameter, establishing, via the first controller, the symbol reader cradle as a slave in a master-slave communication scheme, responsive to the operation of receiving the first communication parameter, establishing, via the second controller, the symbol reader as a master in the master-slave communication scheme, and responsive to the operation of establishing the bidirectional communication link, the second controller establishing, via the second controller, the symbol reader as the slave in the master-slave communication scheme, and establishing, via the first controller, the symbol reader cradle as the master in the master-slave communication scheme.

13. The method of claim 9, wherein the symbol reader comprises a first symbol reader, the method further comprising establishing a second bi-directional link between a second symbol reader and the symbol reader cradle, the second symbol reader including a second symbol reader housing and a second imaging assembly positioned at least partially within the second symbol reader housing, the second imaging assembly having a field of view (FOV), the second imaging assembly being configured to capture image data related to a symbol code, wherein establishing the second bi-directional link comprises:

generating an induced current in a third induction coil positioned within the second symbol reader housing in response to the third induction coil being exposed to the oscillating electromagnetic field, the third induction coil being coupled to a second rechargeable power source positioned within the second symbol reader housing;

electrically charging the second rechargeable power source by the induced current carried through the third induction coil;

receiving, at a third controller positioned within the second symbol reader housing, the first communication parameter by detecting a modulation in the induced current carried through the third induction coil;

responsive to the operation of receiving the first communication parameter at the third controller, instructing, via the third controller, a third short-range communication transceiver positioned within the second symbol reader housing to transmit, via a short-range wireless communication protocol, a radio frequency (RF) signal, the RF signal including (i) the identification data uniquely identifying the first short-range communication transceiver and (ii) a request to establish a bi-directional communication link with the first short-range communication transceiver;

actively listening, via the first short-range communication transceiver, for the RF signal including (i) the identification data uniquely identifying the first short-range communication transceiver and (ii) the request to establish the bi-directional communication link with the first short-range communication transceiver; and responsive to the first short-range communication transceiver receiving the RF signal, establishing the bi-directional communication link between the first short-range communication transceiver and the third short-range communication transceiver, the bi-directional communication link occurring via the short-range wireless communication protocol.

\* \* \* \* \*